(12) United States Patent
Levsen

(10) Patent No.: US 9,482,281 B2
(45) Date of Patent: *Nov. 1, 2016

(54) REMOVABLE BEARING COVER

(71) Applicant: Hantover, Inc., Overland Park, KS (US)

(72) Inventor: Clark A. Levsen, Shawnee, KS (US)

(73) Assignee: Hantover, Inc., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/725,900

(22) Filed: May 29, 2015

(65) Prior Publication Data

US 2015/0260227 A1 Sep. 17, 2015

Related U.S. Application Data

(63) Continuation of application No. 13/716,491, filed on Dec. 17, 2012, now Pat. No. 9,074,634.

(60) Provisional application No. 61/576,226, filed on Dec. 15, 2011.

(51) Int. Cl.
| | |
|---|---|
| *F16C 33/76* | (2006.01) |
| *F16C 33/72* | (2006.01) |
| *B65G 39/09* | (2006.01) |
| *F16C 35/04* | (2006.01) |
| *F16C 13/02* | (2006.01) |

(52) U.S. Cl.
CPC ............. *F16C 33/723* (2013.01); *B65G 39/09* (2013.01); *F16C 13/02* (2013.01); *F16C 35/045* (2013.01); *F16C 2202/44* (2013.01); *F16C 2226/18* (2013.01); *F16C 2326/58* (2013.01)

(58) Field of Classification Search
CPC ........ F16C 13/02; F16C 33/00; F16C 33/72; F16C 33/723; F16C 35/045; F16C 2226/18; F16C 2326/58; B65G 39/09
USPC ................ 384/446, 489; 220/230; 292/251.5
See application file for complete search history.

(56) References Cited

U.S. PATENT DOCUMENTS

| | | | | |
|---|---|---|---|---|
| 2,878,083 | A * | 3/1959 | Altson | B61F 15/12 384/459 |
| 3,259,442 | A * | 7/1966 | Boghosian | F16C 33/80 384/480 |
| 3,331,638 | A * | 7/1967 | Fruth | F16C 33/723 220/293 |
| 4,858,454 | A * | 8/1989 | McAnulty, III | E05B 17/183 16/320 |
| 5,328,276 | A * | 7/1994 | Linteau | F16C 23/084 384/477 |
| 6,283,635 | B1 * | 9/2001 | Downey | F16C 35/045 384/489 |
| 6,581,939 | B1 * | 6/2003 | Theros | F16C 33/723 384/489 |

* cited by examiner

*Primary Examiner* — James Pilkington
(74) *Attorney, Agent, or Firm* — Hovey Williams LLP

(57) ABSTRACT

A bearing cover is provided for attachment relative to a bearing assembly. The cover includes a flange and a magnet associated with the flange. The magnet is configured to removably retain the bearing cover relative to the bearing assembly.

10 Claims, 3 Drawing Sheets

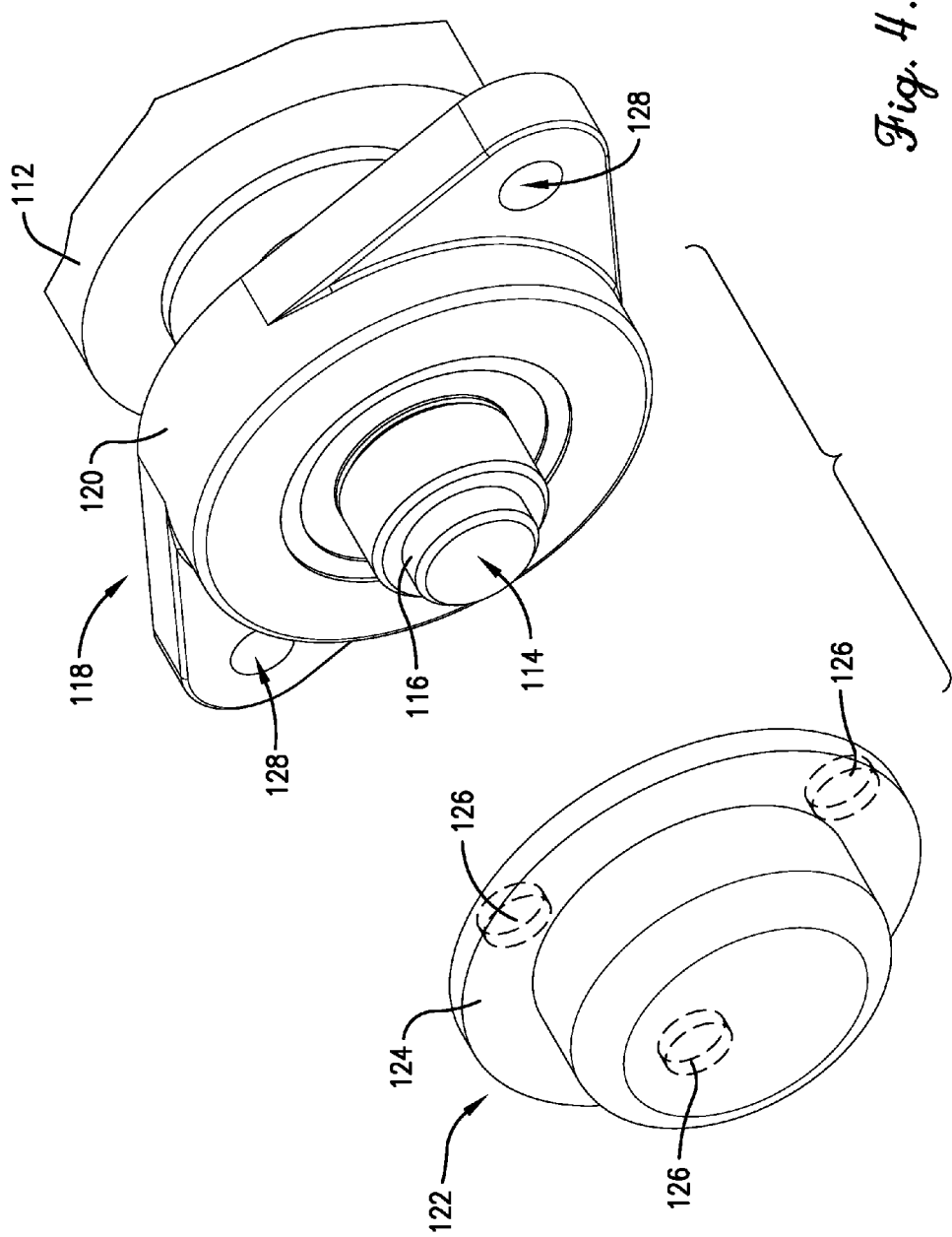

REMOVABLE BEARING COVER

CROSS REFERENCE TO RELATED APPLICATIONS

The present application is a continuation of U.S. patent application Ser. No. 13/716,491, filed Dec. 17, 2012, which claims the benefit of and priority from U.S. Provisional Patent Application No. 61/576,226, filed Dec. 15, 2011, the entire disclosure of each of which is hereby incorporated by reference herein.

BACKGROUND OF THE INVENTION

1. Field of the Invention

The present invention relates generally to a bearing cover for removable attachment to a bearing assembly, wherein the bearing assembly rotatably supports a shaft. More particularly, the present invention relates to a bearing cover including magnets configured to removably retain the bearing cover relative to the bearing assembly such that the shaft is at least in part received within the bearing cover and the bearing assembly is at least in part covered by the bearing cover.

2. Discussion of the Prior Art

Those of ordinary skill in the art will appreciate that bearing assemblies used to support shafts present numerous problems. For example, it important to prevent ingress of dirt or particles into the bearing assembly. A rotating shaft section typically projects outwardly from the bearing assembly, and it is important to reduce the risk of clothing or other appendages getting caught in or otherwise damaged by the rotating shaft. Yet further, bearing assemblies are often lubricated, and it is highly desirable to prevent leakage of lubricants from the bearing assembly into the surrounding environment.

These problems become magnified in tight quarters and/or in "clean" environments, such as with food processing equipment. However, it is also important to keep in mind that these bearing assemblies must be replaced or maintained, and it is therefore desirable for the assembly to be readily accessible.

SUMMARY

According to one aspect of the present invention, a bearing cover is provided. The bearing cover is configured to be removably attached to a bearing assembly. The bearing assembly rotatably supports a shaft, and the shaft projects outwardly from the bearing assembly along an axis to present a shaft end having an axially endmost shaft margin. The bearing cover comprises a flange, an outer wall spaced axially outwardly from the flange, an at least substantially continuous side wall extending between and interconnecting the outer wall and the flange, and a magnet associated with the flange. The side wall and the outer wall at least in part cooperatively define an interior space. The bearing cover is configured to receive the shaft end within the interior space, with the endmost shaft margin being positioned in the interior space, when the bearing cover is attached to the bearing assembly. The magnet is operable to removably retain the bearing cover relative to the bearing assembly such that the bearing assembly is at least in part covered by the bearing cover. The bearing cover comprises a non-magnetizable material. The bearing cover further comprises metal particles embedded in the material. The particles are dispersed throughout the bearing cover so that the bearing cover or a separated portion of the bearing cover is detectable by a metal detector.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein:

FIG. 4 is an expanded fragmentary perspective view of a conveyor system including a bearing assembly, a bearing cover, and a shaft constructed in accordance with a second embodiment of the present invention.

Figure 1:
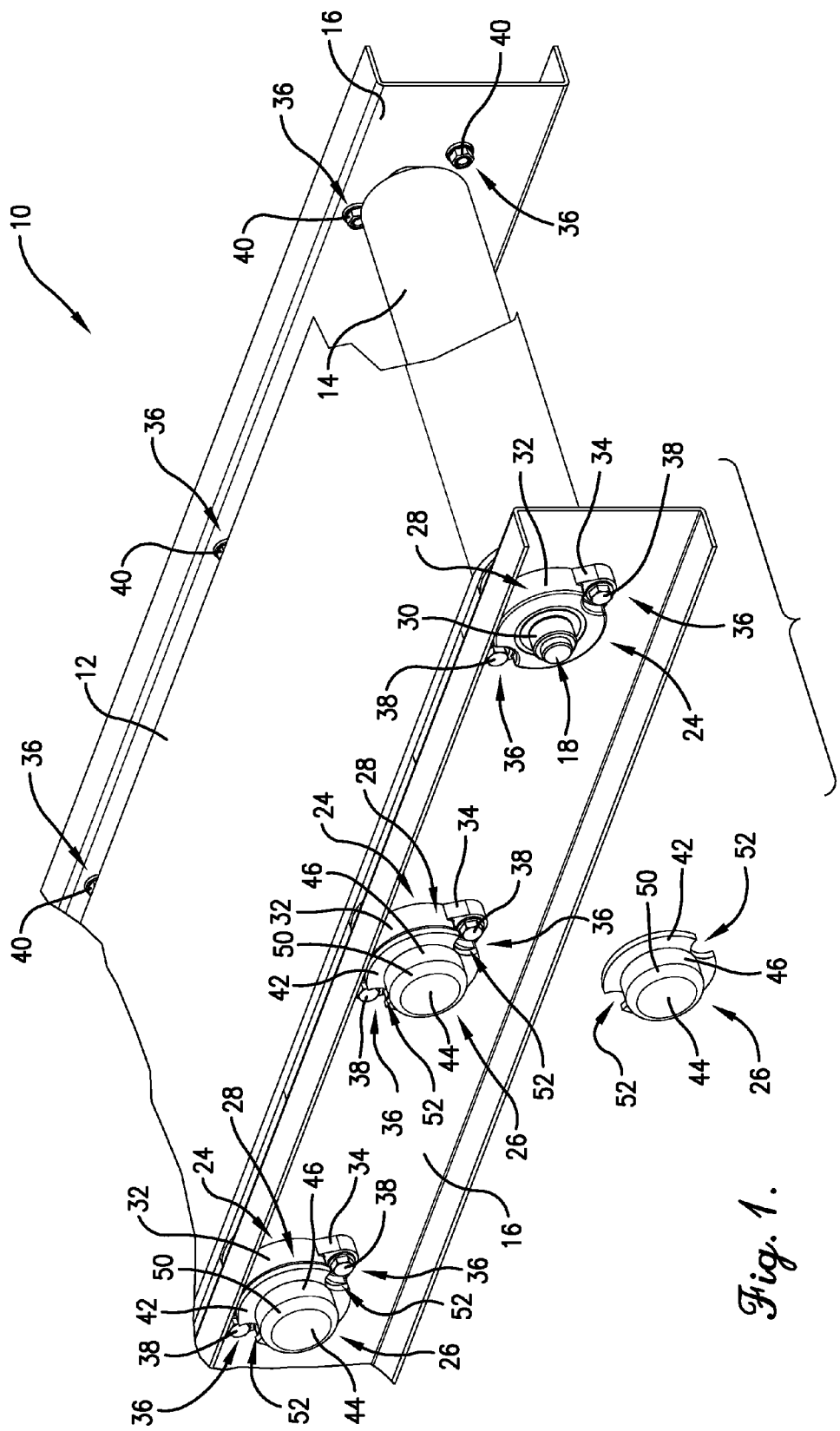
FIG. 1 is a fragmentary perspective view of a conveyor system including bearing covers constructed in accordance with the principles of a first embodiment of the present invention.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

With initial reference to FIG. 1, a conveyor system 10 is illustrated. Preferably, the conveyor system 10 is for use in a food handling environment. For instance, in a preferred embodiment, the conveyor system transports food products through a food processing facility.

The conveyor system 10 preferably includes a belt 12 carried on a plurality of rollers 14 extending between frame walls 16. Each roller 14 is preferably supported on a pair of stub shafts 18 having respective ends 20 and endmost margins 22. Each stub shaft 18 preferably extends outwardly through a respective one of the frame walls 16. The shafts 18 are preferably rotatably supported by respective bearing assemblies 24 mounted on the respective frame walls 16, such that each roller 14 is supported by a pair of bearing assemblies 24. Each bearing assembly 24 is preferably at least in part covered by a bearing cover 26.

In an alternative embodiment, each roller is supported on a single shaft extending through the roller and past its ends. The single shaft is preferably rotatably supported by a pair of bearing assemblies mounted on respective ones of the frame walls, such that each roller is supported by a pair of bearing assemblies. Each bearing assembly is preferably at least in part covered by a bearing cover.

Each bearing assembly 24 preferably includes a stationary housing 28 and a shaft component 30 fixed to the shaft 18 for rotational movement therewith. The bearing assembly 24 preferably further includes an insert (not shown) that rotatably supports the shaft component 30 and, in turn, the shaft 18. Preferably, the insert includes ball bearings. However, it is within the scope of the present invention for any type of bearing assembly and, in turn, any type of insert (e.g., a journal sleeve) to be used. Furthermore, it is permissible for more than one type of bearing assembly to be used throughout the conveyor system 10.

As best shown in FIG. 1, each housing 28 preferably includes a body 32 and a plurality of protrusions 34 extending from the body 32. Preferably, two of the protrusions 34 are provided and are spaced 180 degrees from each other. It is permissible, however, for any number of protrusions to be provided, with both even and uneven spacing between the protrusions being acceptable.

Each of the protrusions 34 preferably defines a fastener-receiving opening (not shown), although it is permissible for such openings to not be provided.

Preferably, the body 32 is circularly annular (i.e., having an outer margin defining a circle and an inner margin defining a circle), although other shapes are permissible. The body might have inner and outer margins each defining a square, a rectangle, or some other polygon, for instance; or each of the inner and outer margins might define a different shape.

Furthermore, the housing might be configured in an entirely different manner in keeping with the type of bearing best suited for the particular application. For instance, the housing might be base-mounted rather than flange-mounted.

Each housing 28 preferably comprises metal. More particularly, each housing 28 preferably comprises a ferromagnetic metal such as iron or steel.

A fastener 36 preferably extends through each fastener-receiving opening and into and through a corresponding opening (not shown) in the respective frame wall 16. In a preferred embodiment, each fastener 36 includes a bolt 38 and a nut 40, but any fastening means known in the art may be utilized without departing from the spirit of the present invention. For instance, each housing 28 might be attached to the corresponding frame walls 16 using screw, clips, adhesives, welding, or a combination of attachment means.

Figure 3:
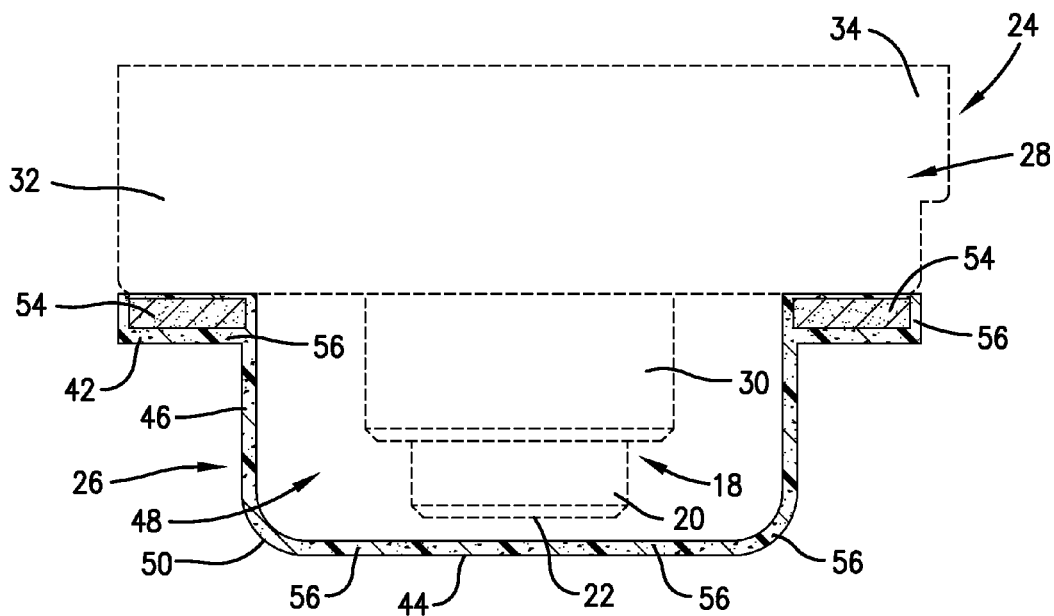
FIG. 3 is a cross-sectional side view of a bearing assembly, a bearing cover, and a shaft of the conveyor system of FIGS. 1 and 2.

Each bearing cover 26 preferably includes a flange 42 and an outer wall 44 spaced outwardly from the flange. A side wall 46 preferably extends between and interconnects the flange 42 and the outer wall 44. The side wall 46 and the outer wall 44 preferably define an interior space 48 (FIG. 3).

Each flange 42 is preferably circularly annular, each outer wall 44 is preferably circular, and each side wall 46 is preferably cylindrical. However, it is within the ambit of the present invention for a different shape to be used for one or more of the components. For instance, the outer wall might be sized smaller than the inner diameter of the flange such that the side wall forms a frustum of a cone in order to interconnect them; or the flange and outer wall might be polygonal and/or vary in shape from each other, as well.

In a preferred embodiment, a smoothed or chamfered region 50 is formed at the intersection of the side wall 46 and the outer wall 44 of each cover 26. As best shown in FIG. 3, the region 50 preferably defines smooth edges. However, it may alternatively define sharp edges. It is also permissible for an abrupt connection to be made instead, or for the side wall and outer wall to be continuously transitioning into each other so as to form a smooth, dome-like structure.

Each cover 26 may be of any size, and its components may have any relative dimensions necessary for the chosen application. For instance, the space between the outer wall 44 and the flange 42 (that is bridged by the side wall 46) might be made very small relative to the size of the flange 42; the diameter of the side wall 46 might be increased relative to the outer diameter of the flange 42; or the width of the flange 42 might be increased or decreased relative to the size of the remaining components of the cover 26.

One or more of the covers may be provided with an attachment (not shown) for oil misting of an exposed bearing, if required, or could include openings (not shown) through which a lubricant could be injected into to onto a bearing assembly.

The covers may also each be provided with ventilation openings (not shown) to facilitate improved cooling of the corresponding bearing assemblies 24.

A pair of fastener-accommodating slots 52 are preferably formed in each flange 42. The slots 52 are preferably at least substantially semi-circular in form, although other shapes are permissible. The slots 52 are configured such that the fasteners 36 may be at least in part accommodated therein without interfering with the cover 26 and, more particularly, with the side wall 46 and the outer wall 44.

As shown in FIG. 3, the bearing cover 26 preferably includes a plurality of magnets 54. Preferably, four magnets are provided, although any number may be used without departing from the spirit of the present invention. For example, the cover may alternatively include a single magnet (e.g. an arcuate shaped magnet, ring magnet, etc.) for magnetically coupling the cover in the desired manner.

In a preferred embodiment, the magnets 54 are spaced about the flange 42. Preferably, the magnets 54 are spaced evenly about flange 42, although uneven spacing is permissible without departing from the scope of the present invention. It is also possible for all or some of the magnets 54 to be placed in or on other portions of the cover 26, including in or on the side wall 46 and/or the outer wall 44.

In a preferred embodiment and as best illustrated in FIG. 3, the magnets 54 are embedded in the flange 42 so as to be encapsulated in the flange 42 (e.g., molded within). It is permissible, however, for the magnets 54 to be attached to or placed on or within the flange 42 by any means known in the art. The magnets might be glued or otherwise adhered to the outer surface of the flange, for instance, or they could be secured in recesses formed in the flange so as to be embedded but not encapsulated.

The magnets 54 are preferably permanent, rare earth magnets. Most preferably, the magnets 54 are neodymium magnets. However, it is permissible for any type of magnets to be used.

The magnets 54 are preferably circular disks. However, the magnets may be of any shape and size required to best fit the application without departing from the scope of the present invention. The shape and size may also vary between the magnets.

Figure 2:
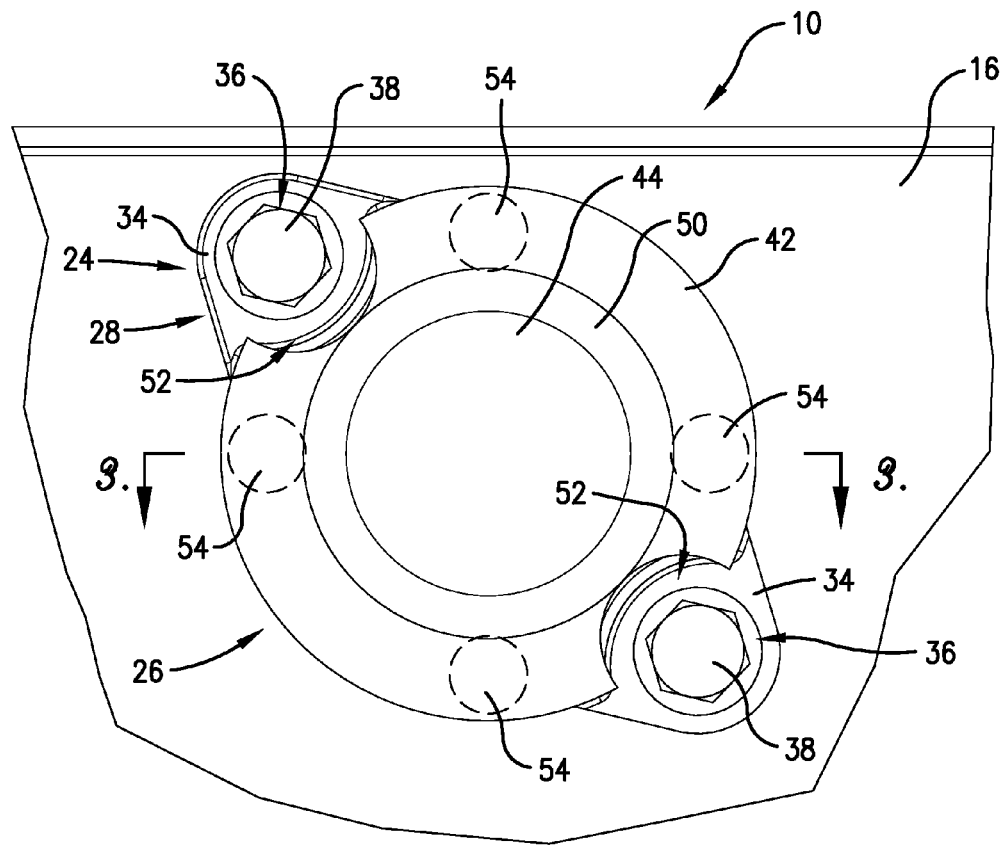
FIG. 2 is an enlarged fragmentary side view of a portion of the conveyor system of FIG. 1, particularly illustrating the outer side of a bearing cover attached to a bearing assembly.

As shown in FIGS. 1-3, the magnets 54 in each flange 42 preferably engage the housing 28 of the corresponding bearing assembly 24 such that the bearing cover 26 is removably retained on the housing 28. However, it is possible for the bearing cover to be configured for attachment to structure other than the bearing housing. For instance, the cover could be configured for attachment to the frame wall. Attachment to more than one structure is permissible, as well. The cover could include two sets of magnets, for instance, with one set engaging the housing and the other set engaging the frame wall.

Preferably, the body 32 of the housing 28 is at least substantially covered by the bearing cover 26. Even further, the end 20 of the shaft 18 is preferably at least substantially received within the interior space 48. Most preferably, the shaft 18 extends so that the endmost margin 22 of the shaft 18 is positioned immediately adjacent (but not in contact with) the outer wall 44.

It is also preferable that at least a portion of the shaft component 30 of the bearing assembly 24 is received within the interior space 48, with the bearing assembly 24 as a whole being at least substantially covered by the bearing cover 26. It is permissible, however, for alternative arrangements to be made without departing from the spirit of the present invention. For instance, a bearing assembly lacking an outward projection such as the illustrated shaft component 30 might not be received within the interior space 48, instead simply being covered by the bearing cover 26. In certain embodiments, the shaft 18 might also fail to extend into the interior space 48.

Provision of the bearing covers 26 is highly advantageous. For instance, a person near the conveyor system 10 is at least substantially protected from the risk of having his or her clothing caught up by one of the rotating shafts 18 or being otherwise injured by the rotating shafts 18. In applications in which water spray, other liquids, dust, and/or other particulate present in the environment (e.g., during high pressure cleaning) need to be kept out of at least part of each of the bearing assemblies 24, the covers 26 provide a barrier against ingress into the interior space 48 and into or onto at least part of the corresponding bearing assemblies 24. Such barrier ability also allows for use of bearings requiring regular maintenance (e.g., regular greasing), rather than more expensive sealed bearings that might otherwise be preferred. In a food processing environment, food being conveyed on the belt 12 is at least substantially protected from contamination due to the transfer or leakage of the bearing lubricant (e.g., grease or oil) and/or by the displacement of wear particles from the bearing assemblies and/or shafts.

Provision of the magnets 54 as a means of attaching each bearing cover 26 to the housing 28 of each corresponding bearing assembly 24 provides numerous advantages. For instance, attachment and removal of each cover 26 can be done without use of tools. This enables quicker attachment and removal, leading to decreased inspection and maintenance times and associated costs. Lack of tool requirements also decrease the likelihood that a tool will be dropped on to the conveyor belt 12 and jam the conveyor system 10, contaminate food carried thereon, and/or be packaged into a product on the line. Furthermore, the ease with which the cover 26 can be attached and removed will encourage more frequent inspection of the bearing assemblies 24 (more particularly, more frequent checks of the lubrication of the bearing assemblies 24), potentially leading to more timely maintenance and, in turn, better performance of the conveyor system 10.

Provision of the magnets 54 as a means of attaching each bearing cover 26 to the housing 28 of the corresponding bearing assembly 24 also enables the elimination of additional fastening means such as nuts and bolts. While such additional fastening means may still be provided within the scope of the present invention, they would in a preferred embodiment be eliminated. Elimination of discrete fasteners for attaching each bearing cover 26 to the corresponding housing 28 would, among other things, decrease the likelihood that a fastener component will be dropped on to the conveyor belt 12 and jam the conveyor system, contaminate food carried thereon, and/or be packaged into a product on the line.

Furthermore, provision of the magnets 54 as a means of attaching each bearing cover 26 to the housing 28 of the corresponding bearing assembly 24 also enables the elimination of the hinge commonly associated with conventional bearing covers. More particularly, conventional bearing covers typically include a plastic hinge about which the cover pivots when it is opened for inspection. If and when the hinge breaks, replacement of the cover is required, leading to expenses both in terms of time costs and material costs.

Preferably, the bearing cover 26 comprises plastic, although any one or more of a variety of materials may be used without departing from the scope of the present invention. The cover 26 may also suitably be of any color or of several colors and may include any markings deemed suitable.

As shown in FIG. 3, the bearing cover 26 preferably further includes particles 56 embedded in the plastic. The particles 56 are preferably metal particles. The plastic may, in some embodiments, therefore be referred to as a metal-filled plastic.

In a preferred embodiment, the particles 56 are at least substantially evenly distributed throughout the cover 26, although an uneven distribution is permissible without departing from the scope of the present invention.

Provision of the particles 56 is highly advantageous. For instance, if circumstances were to arise in which the bearing cover 26 is damaged and a portion thereof is broken loose or otherwise separated and falls into a food product on the conveyor belt 12, the presence of the metal particles 56 in the broken-loose portion would enable the portion to be detected by a metal detector scanning each food product as it passes by the metal detector. Such a detector might be placed along the conveyor belt 12 or in another location through which the product passes during the normal processing procedure. The contaminated food could then be removed from the system to avoid spread of the contamination.

A second preferred embodiment of the present invention is illustrated in FIG. 4. It is initially noted that, with certain exceptions to be discussed in detail below, many of the elements of the bearing cover of the second embodiment are the same as or very similar to those described in detail above in relation to the bearing of the first embodiment. Therefore, for the sake of brevity and clarity, redundant descriptions and numbering are generally avoided here. Unless otherwise specified, the detailed descriptions of the elements presented above with respect to the first embodiment should therefore be understood to apply at least generally to the second embodiment, as well.

As shown in FIG. 4, a conveyor system 110 including a roller 112 is provided. The conveyer system 110 also includes a shaft 114 having an end 116, a bearing assembly 118 rotatably supporting the shaft 144 and including a housing 120, and a bearing cover 122 for removable attachment to the housing 120 of the bearing assembly 118.

Preferably, the bearing cover 122 at least substantially covers the bearing assembly 118 and the end 116 of the shaft 114 when the cover 122 engages the housing 120.

The bearing cover 122 preferably includes a flange 124 and a plurality of magnets 126 spaced about the flange 124. The bearing cover 26 preferably includes three of the magnets 126, spaced evenly about the flange 124.

The housing 120 preferably defines a pair of fastener-receiving openings 128 therethrough. Preferably, the bearing cover 122 and the bearing housing 120 are configured such that fasteners can be inserted into the fastener-receiving openings 128 in the housing 120 without interfering with the cover 122 and, more particularly, with the flange 124. Such a configuration enables the flange 124 to present a constant, circumferentially continuous cross-section Although the above description presents features of preferred embodiments of the present invention, other preferred embodiments may also be created in keeping with the principles of the invention. Furthermore, as noted previously, these other preferred embodiments may in some instances be realized through a combination of features compatible for use together despite having been presented independently as part of separate embodiments in the above description.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and access the reasonably fair scope of the present invention as pertains to any apparatus not materially departing from but outside the literal scope of the invention set forth in the following claims.

What is claimed is:

1. A bearing cover configured to be removably attached to a bearing assembly, wherein the bearing assembly rotatably supports a shaft, and wherein the shaft projects outwardly from the bearing assembly along an axis to present a shaft end having an axially endmost shaft margin, said bearing cover comprising:
   a flange;
   an outer wall spaced axially outwardly from said flange;
   an at least substantially continuous side wall extending between and interconnecting the outer wall and the flange; and
   a magnet associated with the flange,
   said side wall and said outer wall at least in part cooperatively defining an interior space,
   said bearing cover configured to receive the shaft end within the interior space, with the endmost shaft margin being positioned in the interior space, when the bearing cover is attached to the bearing assembly,
   said magnet operable to removably retain the bearing cover relative to the bearing assembly such that the bearing assembly is at least in part covered by the bearing cover,
   said bearing cover comprising a non-magnetizable material,
   said bearing cover further comprising metal particles embedded in the material,
   said particles being dispersed throughout the bearing cover so that the bearing cover or a separated portion of the bearing cover is detectable by a metal detector.

2. The mechanism as claimed in claim 1,
   said magnet being embedded in the flange.

3. The mechanism as claimed in claim 2,
   said magnet including a plurality of magnets spaced evenly about the flange.

4. The mechanism as claimed in claim 1,
   said side wall being at least substantially cylindrical,
   said outer wall being at least substantially circular,
   said flange being at least substantially annular.

5. The mechanism as claimed in claim 1,
   said flange configured to directly engage the bearing assembly.

6. The mechanism as claimed in claim 5,
   said flange defining a fastener-accommodating slot therein.

7. The mechanism as claimed in claim 1,
   said outer wall configured to be immediately adjacent the endmost shaft margin when the bearing cover is attached to the bearing assembly.

8. The mechanism as claimed in claim 1,
   said cover comprising plastic.

9. The mechanism as claimed in claim 1,
   said magnet being a rare earth magnet.

10. The mechanism as claimed in claim 9,
    said magnet being a neodymium magnet.

* * * * *